(12) United States Patent
Harris (10) Patent No.: US 9,707,861 B2
(45) Date of Patent: Jul. 18, 2017

(54) DATA ACQUISITION FOR OPERATION OF A VEHICLE

(75) Inventor: Warner Olan Harris, Banning, CA (US)

(73) Assignee: Clean Emissions Technologies, Inc., Cornelius, NC (US)

(*) Notice: Subject to any disclaimer, the term of this patent is extended or adjusted under 35 U.S.C. 154(b) by 2343 days.

(21) Appl. No.: 12/402,199

(22) Filed: Mar. 11, 2009

(65) Prior Publication Data
US 2009/0240388 A1    Sep. 24, 2009

Related U.S. Application Data

(60) Provisional application No. 61/037,851, filed on Mar. 19, 2008.

(51) Int. Cl.
*B60L 3/00* (2006.01)
*B60L 15/20* (2006.01)
(Continued)

(52) U.S. Cl.
CPC .......... *B60L 15/2045* (2013.01); *B60L 1/003* (2013.01); *B60L 1/06* (2013.01); *B60L 11/14* (2013.01);
(Continued)

(58) Field of Classification Search
USPC ........................................................ 701/22
See application file for complete search history.

(56) References Cited

U.S. PATENT DOCUMENTS

| 1,726,760 A | 9/1929 | Otwell |
| 2,467,398 A | 4/1949 | Miller |

(Continued)

FOREIGN PATENT DOCUMENTS

| DE | 4204384 A1 | 8/1993 |
| DE | 19528629 A1 | 2/1997 |

(Continued)

OTHER PUBLICATIONS

Search and Examination Report, Singapore Patent Application No. 200805771-3, Oct. 29, 2010, 12 pages.
(Continued)

*Primary Examiner* — Nicholas Kiswanto
(74) *Attorney, Agent, or Firm* — Kelly Kordzik; Matheson Keys Daffer & Kordzik PLLC (57) ABSTRACT

A vehicle has independent electric traction system (ETS) and internal combustion engine (ICE). A system controller, a data acquisition system, and a GPS system are added to the vehicle. A remote system has a data base of locations identifying emission non-attainment areas. The data acquisition system obtains the vehicle location along with parametric data related to operation of the vehicle. The remote system notifies the vehicle operator and the auxiliary control system of opportunities to obtain emission reduction credits in response to the vehicle location data and its operating status. The system controller or the operator switch between ICE operation and ETS operation in response to the vehicle location, emission reduction credit process, and parametric measurements of the vehicle operation to achieve an emissions credit result while optimizing fuel for the ICE and stored electrical potential energy for the ETS.

22 Claims, 3 Drawing Sheets

(51) Int. Cl.
*B60L 1/00* (2006.01)
*B60L 11/14* (2006.01)
*G06Q 50/30* (2012.01)
*G08G 1/0967* (2006.01)
*B60L 1/06* (2006.01)
*B60L 11/18* (2006.01)
*B60W 20/00* (2016.01)

(52) U.S. Cl.
CPC .......... *B60L 11/1887* (2013.01); *G06Q 50/30* (2013.01); *G08G 1/096741* (2013.01); *G08G 1/096775* (2013.01); *B60L 2200/36* (2013.01); *B60L 2240/34* (2013.01); *B60L 2240/445* (2013.01); *B60L 2240/62* (2013.01); *B60L 2240/622* (2013.01); *B60L 2240/70* (2013.01); *B60L 2270/40* (2013.01); *B60W 20/00* (2013.01); *B60W 2550/402* (2013.01); *Y02T 10/645* (2013.01); *Y02T 10/70* (2013.01); *Y02T 10/7077* (2013.01); *Y02T 10/72* (2013.01); *Y02T 10/7283* (2013.01); *Y02T 10/7291* (2013.01); *Y02T 90/16* (2013.01); *Y02T 90/161* (2013.01); *Y02T 90/162* (2013.01); *Y02T 90/34* (2013.01); *Y10T 29/49716* (2015.01)

(56) References Cited

U.S. PATENT DOCUMENTS

| | | |
|---|---|---|
| 2,677,251 A | 5/1954 | Clark et al. |
| 2,810,293 A | 10/1957 | George et al. |
| 2,923,171 A | 2/1960 | George |
| 2,930,242 A | 3/1960 | George |
| 3,209,604 A | 10/1965 | Mitchell et al. |
| 3,241,628 A | 3/1966 | Thomas |
| 3,597,935 A | 8/1971 | Pierrat |
| 3,599,814 A | 8/1971 | Brownfield |
| 3,646,773 A | 3/1972 | Falk et al. |
| 3,716,768 A | 2/1973 | Mason |
| 3,792,327 A | 2/1974 | Waldorf |
| 3,882,950 A | 5/1975 | Strohlein |
| 4,193,271 A | 3/1980 | Honigsbaum |
| 4,271,677 A | 6/1981 | Harr |
| 4,280,330 A | 7/1981 | Harris et al. |
| 4,438,342 A | 3/1984 | Kenyon |
| 4,448,157 A | 5/1984 | Eckstein et al. |
| 4,461,988 A | 7/1984 | Plunkett |
| 4,470,476 A | 9/1984 | Hunt |
| 4,531,379 A | 7/1985 | Diefenthaler et al. |
| 4,588,040 A | 5/1986 | Albright, Jr. |
| 4,658,599 A | 4/1987 | Kajiwara |
| 4,711,204 A | 12/1987 | Rusconi |
| 4,712,636 A | 12/1987 | Ishimatsu |
| 4,732,229 A | 3/1988 | Lucht |
| 4,825,663 A | 5/1989 | Nijjar et al. |
| 4,828,452 A | 5/1989 | Bolitho |
| 4,846,327 A | 7/1989 | Mayer |
| 4,947,657 A | 8/1990 | Kalmbach |
| 4,976,114 A | 12/1990 | Manning |
| RE33,687 E | 9/1991 | Greer |
| 5,046,326 A | 9/1991 | Havemann et al. |
| 5,048,657 A | 9/1991 | Dissett et al. |
| 5,190,118 A | 3/1993 | Yelton |
| 5,255,733 A | 10/1993 | King |
| 5,267,635 A | 12/1993 | Peterson et al. |
| 5,307,645 A | 5/1994 | Pannell |
| 5,343,970 A | 9/1994 | Severinsky |
| 5,346,031 A | 9/1994 | Gardner |
| 5,522,778 A | 6/1996 | Iwase et al. |
| 5,558,588 A | 9/1996 | Schmidt |
| 5,631,532 A | 5/1997 | Azuma et al. |
| 5,637,987 A | 6/1997 | Fattic |
| 5,644,200 A | 7/1997 | Yang |
| 5,656,921 A | 8/1997 | Farrall |
| 5,667,029 A | 9/1997 | Urban |
| 5,669,842 A | 9/1997 | Schmidt |
| 5,722,911 A | 3/1998 | Ibaraki |
| 5,755,303 A | 5/1998 | Yamamoto |
| 5,773,904 A | 6/1998 | Schiebold et al. |
| 5,775,449 A | 7/1998 | Moroto |
| 5,799,632 A | 9/1998 | Bennett |
| 5,799,744 A | 9/1998 | Yamaguchi |
| 5,801,499 A | 9/1998 | Tsuzuki |
| 5,806,617 A | 9/1998 | Yamaguchi |
| 5,810,321 A | 9/1998 | Presson |
| 5,815,824 A | 9/1998 | Saga et al. |
| 5,823,282 A | 10/1998 | Yamaguchi |
| 5,841,201 A | 11/1998 | Tabata |
| 5,842,534 A | 12/1998 | Frank |
| 5,845,731 A | 12/1998 | Buglione |
| 5,847,469 A | 12/1998 | Tabata |
| 5,862,497 A | 1/1999 | Yano |
| 5,881,564 A | 3/1999 | Kishimoto |
| 5,887,670 A | 3/1999 | Tabata |
| 5,896,750 A | 4/1999 | Karl |
| 5,942,879 A | 8/1999 | Ibaraki |
| 5,951,614 A | 9/1999 | Tabata |
| 6,038,877 A | 3/2000 | Peiffer et al. |
| 6,059,059 A | 5/2000 | Schmidt-Brucken |
| 6,080,081 A | 6/2000 | Sauermann et al. |
| 6,112,151 A * | 8/2000 | Kruse ................ F02D 41/2422 180/167 |
| 6,138,788 A | 10/2000 | Bohner et al. |
| 6,151,891 A | 11/2000 | Bennett |
| 6,155,364 A | 12/2000 | Nagano et al. |
| 6,164,400 A | 12/2000 | Jankovic |
| 6,209,672 B1 | 4/2001 | Severinsky |
| 6,238,814 B1 | 5/2001 | Horiguchi et al. |
| 6,260,539 B1 * | 7/2001 | Minowa ............ B60R 16/0236 123/478 |
| 6,269,713 B1 | 8/2001 | Ohke |
| 6,276,161 B1 | 8/2001 | Peiffer et al. |
| 6,318,486 B2 | 11/2001 | Masaki |
| 6,332,257 B1 | 12/2001 | Reed, Jr. et al. |
| 6,338,391 B1 | 1/2002 | Severinsky |
| 6,340,339 B1 | 1/2002 | Tabata et al. |
| 6,351,957 B2 | 3/2002 | Hara et al. |
| 6,367,570 B1 | 4/2002 | Long, III |
| 6,405,818 B1 | 6/2002 | Anthony |
| 6,419,040 B2 | 7/2002 | Kitano |
| 6,427,100 B1 | 7/2002 | Kaku |
| 6,441,506 B2 | 8/2002 | Nakashima |
| 6,480,767 B2 | 11/2002 | Yamaguchi et al. |
| 6,484,831 B1 | 11/2002 | Gauthier |
| 6,488,345 B1 | 12/2002 | Woody et al. |
| 6,488,609 B1 | 12/2002 | Morimoto |
| 6,519,513 B2 | 2/2003 | Nakagawa |
| 6,520,160 B2 | 2/2003 | Kojima |
| 6,554,088 B2 | 4/2003 | Severinsky |
| 6,557,655 B2 | 5/2003 | Ovshinsky |
| 6,558,290 B2 | 5/2003 | Phillips |
| 6,558,827 B1 | 5/2003 | Reiser et al. |
| 6,570,265 B1 | 5/2003 | Shiraishi |
| 6,616,569 B2 | 9/2003 | Hoang et al. |
| 6,629,027 B2 | 9/2003 | Yamaguchi |
| 6,651,759 B1 | 11/2003 | Gruenwald et al. |
| 6,655,488 B2 | 12/2003 | Braud |
| 6,658,852 B2 | 12/2003 | Frey |
| 6,664,651 B1 | 12/2003 | Kotre |
| 6,672,415 B1 | 1/2004 | Tabata |
| 6,687,603 B2 | 2/2004 | Wakashiro |
| 6,688,411 B2 | 2/2004 | Boggs |
| 6,692,403 B2 | 2/2004 | Charaudeau et al. |
| 6,694,232 B2 | 2/2004 | Saito |
| 6,697,717 B2 * | 2/2004 | Shioda ................ B60K 6/48 180/65.25 |
| 6,705,416 B1 | 3/2004 | Glonner |
| 6,712,165 B1 | 3/2004 | Okazaki |
| 6,721,637 B2 | 4/2004 | Abe |
| 6,735,502 B2 | 5/2004 | Phillips |
| 6,740,987 B2 | 5/2004 | Kitajima |
| 6,745,117 B1 | 6/2004 | Thacher |
| 6,768,932 B2 | 7/2004 | Claypole |
| 6,781,251 B2 | 8/2004 | Takaoka |

(56) References Cited

U.S. PATENT DOCUMENTS

| | | |
|---|---|---|
| 6,787,932 B2 | 9/2004 | Takaoka |
| 6,796,367 B2 | 9/2004 | Blacquiere et al. |
| 6,805,211 B2 | 10/2004 | Fujikawa |
| 6,808,470 B2 | 10/2004 | Boll |
| 6,840,341 B2 | 1/2005 | Fujikawa |
| 6,851,470 B2 | 2/2005 | Laukhuf |
| 6,857,985 B2 | 2/2005 | Williams |
| 6,862,511 B1 | 3/2005 | Phillips et al. |
| 6,867,509 B1 | 3/2005 | Takaoka |
| 6,868,927 B2 | 3/2005 | Boll |
| 6,881,167 B2 | 4/2005 | Inada |
| 6,892,541 B2 | 5/2005 | Suzuki |
| 6,907,337 B2 | 6/2005 | Phillips et al. |
| 6,915,198 B2 | 7/2005 | Phillips et al. |
| 6,921,984 B2 | 7/2005 | Rogg |
| 6,966,868 B2 | 11/2005 | Stork et al. |
| 6,986,398 B2 * | 1/2006 | Obayashi ............... H02J 1/14 180/167 |
| 6,986,645 B2 | 1/2006 | Iwanami |
| 6,991,053 B2 | 1/2006 | Kuang |
| 6,994,177 B2 | 2/2006 | Ito |
| 6,994,360 B2 | 2/2006 | Kuang |
| 6,998,727 B2 | 2/2006 | Gray |
| 7,004,273 B1 | 2/2006 | Gruenwald |
| 7,021,409 B2 | 4/2006 | Tamor |
| 7,035,727 B2 | 4/2006 | De La Salle et al. |
| 7,055,337 B2 | 6/2006 | Horn |
| 7,055,636 B2 | 6/2006 | Komiyama |
| 7,062,371 B2 * | 6/2006 | Gault ............... F02D 41/2422 701/109 |
| 7,091,839 B2 | 8/2006 | Situ et al. |
| 7,102,313 B2 | 9/2006 | Kadota |
| 7,104,347 B2 | 9/2006 | Severinsky |
| 7,104,920 B2 | 9/2006 | Beaty et al. |
| 7,107,776 B2 | 9/2006 | Ikura et al. |
| 7,111,704 B2 | 9/2006 | Johnson |
| 7,130,766 B2 * | 10/2006 | Tanase ............... G06Q 30/02 324/512 |
| 7,135,785 B2 | 11/2006 | Kropp |
| 7,143,851 B2 | 12/2006 | Masterson |
| 7,147,072 B2 | 12/2006 | Botti |
| 7,223,200 B2 | 5/2007 | Kojima |
| 7,237,634 B2 | 7/2007 | Severinsky |
| 7,240,749 B2 | 7/2007 | Bhavsar |
| 7,273,119 B2 | 9/2007 | Tsuneyoshi |
| 7,275,610 B2 | 10/2007 | Kuang |
| 7,285,869 B2 | 10/2007 | Syed |
| 7,301,302 B2 | 11/2007 | Yoshii |
| 7,306,064 B2 | 12/2007 | Imazu |
| 7,315,090 B2 | 1/2008 | Yang |
| 7,392,871 B2 | 7/2008 | Severinsky |
| 7,407,026 B2 | 8/2008 | Tamor |
| 7,455,134 B2 | 11/2008 | Severinsky |
| 7,469,758 B2 | 12/2008 | Iwanaka |
| 7,469,858 B2 | 12/2008 | Edelson |
| 7,487,852 B2 | 2/2009 | Leone |
| 7,497,198 B2 | 3/2009 | Leone |
| 7,506,711 B2 | 3/2009 | Usoro |
| 7,520,353 B2 | 4/2009 | Severinsky |
| 7,543,454 B2 | 6/2009 | Harris |
| 7,551,064 B2 | 6/2009 | Pudelko et al. |
| 7,559,388 B2 | 7/2009 | Severinsky |
| 7,580,808 B2 | 8/2009 | Bos |
| 7,600,595 B2 | 10/2009 | Harris |
| 8,346,603 B2 * | 1/2013 | Sakakibara ............ G06Q 10/10 701/22 |
| 8,386,148 B2 * | 2/2013 | Hyde ............... F02D 41/021 701/102 |
| 2001/0022245 A1 | 9/2001 | Rogg |
| 2001/0039230 A1 | 11/2001 | Severinsky |
| 2002/0040818 A1 | 4/2002 | Maruyama |
| 2003/0055665 A1 * | 3/2003 | Fleming ............ G06Q 20/0855 705/78 |
| 2003/0062205 A1 | 4/2003 | Konrad et al. |
| 2003/0162631 A1 | 8/2003 | Williams |
| 2003/0217876 A1 | 11/2003 | Severinsky |
| 2004/0093264 A1 | 5/2004 | Shimizu |
| 2004/0157704 A1 | 8/2004 | Stork et al. |
| 2004/0200648 A1 | 10/2004 | Tarasinski et al. |
| 2004/0207205 A1 | 10/2004 | Kikuchi |
| 2005/0060076 A1 | 3/2005 | Phillips et al. |
| 2005/0060079 A1 | 3/2005 | Phillips et al. |
| 2005/0060080 A1 | 3/2005 | Phillips et al. |
| 2005/0107198 A1 | 5/2005 | Sowul et al. |
| 2005/0109550 A1 | 5/2005 | Buglione et al. |
| 2005/0113202 A1 | 5/2005 | Miller et al. |
| 2005/0173523 A1 * | 8/2005 | Yushio .................. F01N 11/00 235/384 |
| 2005/0211479 A1 | 9/2005 | Tamor |
| 2005/0224264 A1 | 10/2005 | Perrin |
| 2005/0251299 A1 | 11/2005 | Donnelly et al. |
| 2006/0100057 A1 | 5/2006 | Severinsky |
| 2006/0108161 A1 | 5/2006 | Feliss et al. |
| 2006/0129289 A1 * | 6/2006 | Kumar .................. B60L 11/123 105/26.05 |
| 2006/0207274 A1 | 9/2006 | Harris |
| 2006/0213704 A1 | 9/2006 | Mack |
| 2006/0231304 A1 | 10/2006 | Severinsky |
| 2006/0231305 A1 | 10/2006 | Severinsky |
| 2006/0231306 A1 | 10/2006 | Severinsky |
| 2006/0237246 A1 | 10/2006 | Severinsky |
| 2006/0237247 A1 | 10/2006 | Severinsky |
| 2006/0258505 A1 | 11/2006 | Vafidis |
| 2007/0030450 A1 | 2/2007 | Liang |
| 2007/0056784 A1 | 3/2007 | Joe |
| 2007/0080005 A1 | 4/2007 | Joe |
| 2007/0107956 A1 | 5/2007 | Matsubara |
| 2007/0107958 A1 | 5/2007 | Oliver |
| 2007/0124037 A1 | 5/2007 | Moran |
| 2007/0137909 A1 | 6/2007 | Zillmer et al. |
| 2007/0169970 A1 | 7/2007 | Kydd |
| 2007/0181355 A1 | 8/2007 | Harris |
| 2007/0246274 A1 | 10/2007 | Dreibholz |
| 2007/0272456 A1 | 11/2007 | Shiiba |
| 2007/0278022 A1 | 12/2007 | Tanishima |
| 2008/0000700 A1 | 1/2008 | Kotani |
| 2008/0006467 A1 | 1/2008 | Morishita |
| 2008/0012535 A1 | 1/2008 | Takatsuji |
| 2008/0029319 A1 | 2/2008 | Fleckner |
| 2008/0029320 A1 | 2/2008 | Fleckner |
| 2008/0076616 A1 | 3/2008 | Kidokoro |
| 2008/0096711 A1 | 4/2008 | Smith |
| 2008/0154671 A1 * | 6/2008 | Delk .................. G01N 33/0075 |
| 2008/0220933 A1 | 9/2008 | Maeda |
| 2008/0236912 A1 | 10/2008 | Ueoka |
| 2008/0243324 A1 | 10/2008 | Harris |
| 2008/0288132 A1 * | 11/2008 | King ................... B60L 11/123 701/22 |
| 2009/0018716 A1 | 1/2009 | Ambrosio |
| 2009/0024267 A1 | 1/2009 | Kawai |
| 2009/0030568 A1 | 1/2009 | Amano |
| 2009/0095549 A1 | 4/2009 | Dalum |
| 2009/0107744 A1 | 4/2009 | Foersterling |
| 2009/0177345 A1 | 7/2009 | Severinsky |
| 2009/0254241 A1 | 10/2009 | Basir |
| 2013/0073129 A1 * | 3/2013 | Martin ................. B60W 20/00 701/22 |

FOREIGN PATENT DOCUMENTS

| | | |
|---|---|---|
| EP | 0492152 | 7/1992 |
| EP | 0645271 | 3/1995 |
| EP | 1068976 B1 | 1/2001 |
| EP | 1 140 533 | 1/2003 |
| EP | 1297982 | 4/2003 |
| EP | 0 784 743 | 5/2003 |
| EP | 1759915 | 3/2009 |
| FR | 2699127 | 6/1994 |
| FR | 2910101 | 6/2008 |
| JP | 03239631 A | 10/1991 |
| JP | 07-195955 | 8/1995 |
| JP | H07240213 | 9/1995 |

(56) References Cited

FOREIGN PATENT DOCUMENTS

| JP | 11-146502 | 5/1999 |
|---|---|---|
| JP | 200023301 A | 1/2000 |
| JP | 2001-105910 | 4/2001 |
| JP | 2002118903 | 4/2002 |
| JP | 2002-247712 | 8/2002 |
| JP | 2004017890 | 1/2004 |
| JP | 2004136743 | 5/2004 |
| JP | 2004-236609 | 8/2004 |
| JP | 2004-318370 | 11/2004 |
| WO | WO2004062957 A1 | 7/2004 |
| WO | WO2005003600 A1 | 1/2005 |
| WO | WO2006038968 | 4/2006 |
| WO | WO2006099427 A2 | 9/2006 |
| WO | WO2007030069 A1 | 3/2007 |
| WO | WO2007/097819 | 8/2007 |
| WO | WO2009086135 A2 | 7/2009 |

OTHER PUBLICATIONS

Office Action, China Patent Application No. 200680053009.2, Nov. 3, 2010. 4 pages.
International Search Report and Written Opinion of the International Searching Authority, International Application No. PCT/US2010/028978, dated Dec. 15, 2010.
First Office Action, Japanese Patent Application No. 2008-556310 dated Apr. 5, 2011, 7 pages.
English language Abstract prepared by Japanese Patent Office, Publication No. 2002-247712, date of publication Aug. 30, 2002.
English language Abstract prepared by Japanese Patent Office, Publication No. 2001-105910. date of publication Apr. 17, 2001.
International Preliminary Report on Patentability, Written Opinion of the International Searching Authority, International Application No. PCT/US2009/036904, dated Sep. 21, 2010.
European Search Report, Application No. EP 11164435; dated Jun. 20, 2011.
United States Patent and Trademark Office, Office Action, U.S. Appl. No. 12/469,493, dated Jun. 10, 2011.
Korean Intellectual Property Office, Notice to File a Response, Preliminary Rejection, Patent Application No. 10-2010-7023374 dated Jan. 11, 2011.
International Search Report and Written Opinion from the International Searching Authority, PCT/US2010/047819, mailed Oct. 28, 2010, 8 pages.
Korean Intellectual Property Office, Notice to File a Response, Preliminary Rejection, Patent Application No. 10-2010-7023374 dated Jul. 11, 2011.
Memo Concerning the Official Action Reported in the Covering Letter; Mexican Patent Application No. MX/a/2010/010249, 4 pages.

English Translation of Office Action for Taiwan Invention Patent Application No. 096105113 dated Jun. 29, 2011, 17 pages.
European Search Report dated 2009, Nov. 23, Application No. 06850144.4-2207/199439, 6 pages.
International Search Report and Written Opinion dated Jun. 12, 2009, Application No. PCT/US2009/038938, 12 pages.
Palumbo, Anthony J., et al, "Ultracapacitor Based Hybrid Booster Drive," 20th International Electric Vehicle Symposium and Exposition (EVS 20): Powering Sustainable Transportation, Aug. 2003, revised Jun. 2004, 16 pages.
International Search Report Dated Mar. 20, 2008; Application No. PCT/ USO6/60833, 10 pages.
U.S. Army Public Affairs Office, "TARDEC Sponsors Cross-Country Fuel Cell Truck Expedition." RDECOM Magazine, Jul. 2005, p. 6, Aberdeen Proving Ground, MD.
Southwest Research Institute, "Fuel cell-assisted truck completes cross-country trek," http://www.swri.org/9what/releases/2005/fuelcell.htm, May 26, 2005, SwRI, San Antonio, TX.
Brodrick et al., "Demonstration of Proton Exchange Membrane Fuel Cell as an Auxiliary Power Source for Heavy Trucks," SAE Transactions, 2000, vol. 109, Previously Presented 783-788, NY, NY.
http://www.gears-manufacturers.com/power-take-offs.html; "Power Take-Offs"; 3 pages.
International Preliminary Report on Patentability dated Mar. 9, 2009, Application No. PCT/US06/60833, 12 pages.
International Search Report and Written Opinion Dated Nov. 5, 2008, Application No. PCT/US2008/072672, 6 pages.
International Search Report and Written Opinion dated May 14, 2009, Application No. PCT/US2009/036904, 15 pages.
Singapore International Search Report and Written Opinion, dated Nov. 5, 2010, Application No. 200805771-3, 11 pages.
European Examination Report; Application No. 09728436.9-2421; dated Sep. 1, 2011.
International Preliminary Report on Patentability and Written Opinion of the International Searching Authority; International Application No. PCT/US2010/028978, dated Sep. 13, 2011, 13 pages.
European Patent Office, Examination Report, Application No. 08797526.4, dated Oct. 12, 2011.
European Patent Office, Search Report, Application No. 08797526.4, dated Sep. 30, 2011.
Translation of EP 0 492 152 A1, European Patent Application No. 91120122.6, filing date Nov. 26, 1991.
European Patent Office, Patent Abstracts of Japan, Publication No. 2004-136743.
European Search Report, Application No. EP11164435, Jun. 20, 2011. 7 pages.
Decision on Rejection, Application No. 2008-556310, Apr. 24, 2012.
International Bureau of WIPO; International Preliminary Report on Patentability, PCT/US2010/047819, Mar. 15, 2012, 7 pages.

\* cited by examiner

DATA ACQUISITION FOR OPERATION OF A VEHICLE

RELATED APPLICATIONS

This application claims priority to provisional application 61/037,851 filed on Mar. 19, 2008 and is related to provisional application 60/661,668 (Hydrogen Fuel Cell Powered Cabin Comfort System for Class 7 & 8 Trucks) filed on Mar. 14, 2005, non-provisional application Ser. No. 11/374,709 (Fuel Cell-Driven Auxiliary System, and Method Therefore) filed on Mar. 14, 2006, provisional application 60/774,732 (Hybrid Electric Traction Power System for Moving Class 7 & 8 Tractors By Means of a Drive Motor Attached to the Power Takeoff (PTO) of the Tractor's transmission PTO Connection Point) filed on Feb. 21, 2006, and non-provisional application Ser. No. 11/558,786 (Electric Traction) filed on Nov. 10, 2006, which are all hereby incorporated herein by reference.

TECHNICAL FIELD

This invention relates to operation of a vehicle having an internal combustion engine mode and an electric traction system operation mode, and more particularly to operating the vehicle to maximize the reduction in emissions and the obtaining credit therefrom.

BACKGROUND AND SUMMARY

According to current trends, heavy duty diesel trucks are increasingly subject to legal restrictions, including restrictions regarding emissions and also regarding idling time. In some jurisdictions, legal restrictions may even require that such a truck be outfitted with controls for detecting idling and automatically shutting down the diesel engine after a certain maximum idling interval. Inventions disclosed in the related applications address issues arising from these legal restrictions. These inventions provide an improved arrangement for a vehicle, including a vehicle such as a heavy duty diesel engine truck, so the vehicle can be driven via an electric motor. One implication is that an existing, conventional vehicle may be more easily retrofitted for traction via electric motors. The inventions also provide an improved arrangement for cooling a vehicle via an independent power supply when the internal combustion engine ("ICE") is shut off. The inventions also provide an improved arrangement for heating and convenience electrical outlets.

The U.S. Environmental Protection Agency (EPA) has set National Ambient Air Quality Standards (NAAQS) for six common air pollutants, also called "criteria" pollutants. The criteria pollutants are carbon monoxide, nitrogen dioxide, ozone, lead, particulate matter and sulfur dioxide. NAAQS are often referred to as federal health standards for outdoor air.

The Clean Air Act, which was passed in 1970 and last amended in 1990, requires the EPA to set NAAQS for pollutants that cause adverse effects to public health and the environment. The Clean Air Act established primary and secondary air quality standards. Primary standards protect public health, including the health of "sensitive" populations such as asthmatics, children, and the elderly. The primary standard is often referred to as the health standard. Secondary standards protect public welfare, including protection against decreased visibility, damage to animals, crops, vegetation, and buildings. Standards are reviewed periodically to ensure that they include the most recent scientific information.

Non-attainment areas are regions within the country where the concentration of one or more criteria pollutants exceeds the level set as the federal air quality standards. Once the EPA announces that an area does not meet the health standard, the State works with businesses, local governments, and the public to reduce the emissions from sources contributing to the non-attainment status of the area.

The present invention involves a recognition that the related inventions present new opportunities for further innovation. For example, given the teachings of the related patent applications about integrating electrical operation with conventional ICE operation of a vehicle, heretofore unappreciated emissions reduction opportunities are presented. These emission reduction opportunities that are presented by electrical operation are particularly attractive for heavy duty diesel trucks and in connection with numerous contexts, including:

idling for long intervals, which may occur, for example, at rest stops, alternating between idling and sporadically moving, which may occur, for example, while waiting at ports and other staging areas, and alternating episodically between operating at higher speeds and slower speeds, such as may occur when encountering traffic on streets and highways.

An electric motor and its power supply, which are independent of the vehicle's ICE, may be insufficient for operation at higher speeds. Thus, when operational demands include higher speed driving, this gives rise to the need to episodically alternate between electric traction system ("ETS") operation mode and ICE operation mode more frequently and while moving. However, even when the problem of episodic ETS/ICE operation mode switching and other problems associated with electrical operation for rest stop idling and for sporadic slow speed operation have been overcome, issues arise regarding incentives for use of the ETS operating mode. For example, a driver might not be sufficiently motivated to switch to the ETS operating mode, even though obstacles that may have previously prevented electrical operation have been overcome.

The present invention provides an onboard data acquisition device that communicates with a global positioning system ("GPS") of the vehicle to provide an incentive for a driver to take advantage of opportunities to use ETS operating modes. In one embodiment the data acquisition device, in communication with the GPS and the control system of the vehicle, data is communicated to a remote device in order to advantageously obtain emission reduction credits in cooperation with a mechanism approved by a regulatory agency.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

It should be appreciated that according to one or more implementations of anti-idling legislation or regulations that are anticipated or already implemented, an anti-idling timer must shut down a vehicle's (e.g., diesel truck) ICE automatically after a certain period of idling. However, according to these implementations, which up to now have not fully appreciated the potential availability of ETS operation, the anti-idling timer may be automatically reset responsive to a driver action such as depressing the vehicle's clutch, brake or foot feed. Therefore, according to currently anticipated practice, anti-idling automatic shutdown systems will not shut off the vehicle's ICE if the driver is present and takes very simple actions which naturally occur in traffic. Such practice is at least partly because it may not be practical (or even effective for emissions reduction) to shut off the ICE of a vehicle in traffic unless it has a forced ETS-only operation mode. However, a forced ETS operating mode is not presently contemplated by any current regulations. Consequently, a driver may be inclined to simply sustain ICE operation and prevent an anti-idling system initiated automatic ICE shutdown rather than switch to ETS-only operation mode; even while sitting at a standstill for more than five minutes. As a result of the conventional anti-idling control arrangement, a driver may miss opportunities to reduce emissions when using a vehicle that is equipped with an ETS operating mode.

An embodiment of the present invention combines an ETS electric motor, power supply and controls (such as has been disclosed in the related patent applications) with a GPS system, data acquisition system, and ETS control system features. The ETS control system enables the driver to switch to ETS-only operating mode in traffic even while moving or in other circumstances in which ETS operational states are appropriate. The ETS control system signals the driver of opportunities to switch to the ETS operating mode to gain emissions reduction credits responsive to detecting a requisite operational state such as described herein.

The data acquisition system may receive timing data from the control system of the vehicle indicating times spent in different operation modes of operation, including an ETS-only operation mode of operation in which the ICE is shut off and the ETS motor is in use. In one embodiment, the control system generates this timing data responsive to detecting the position of a switch that activates the ETS-only operation mode.

The data acquisition system reports its acquired data. This reporting may include storing the data and communicating it to an external device after a delay or immediately communicating it to an external device, such as via hard wire, a short-range wireless link or a cellular or satellite telephone network connection, which may include uploading via a computer network to a remote computer system. In another embodiment, the data acquisition device receives and reports data and information from the GPS that indicates where the vehicle is physically located at the times the vehicle is being operated in its various operational modes, particularly the ETS-only operation mode. In response to the reported data, the driver may be eligible to receive emissions reduction credits for turning off the ICE. The potential for receiving such emission reduction credits may motivate the driver to voluntarily reduce emissions by switching to ETS-only operation mode. The emission reduction credits are therefore facilitated by the data acquisition system reporting, which may be in accordance with an emission reduction credit process approved by a governmental regulatory agency. According to the approved emission reduction credit process, the data acquisition system or the remote device may assign the emission credits a predetermined cash value according to a fixed schedule, which may be updated frequently or infrequently. Alternatively, the data acquisition system or the remote device may sell or at least initiate the sale of the credits in an auction market and, correspondingly, account for the credits according to the auction market determined prices.

In order to ensure that emission reductions are credited only when ETS operation preempts what would otherwise have been a legitimate ICE operating mode or in order to determine the nature of emission reductions, the data acquisition, ETS control system and the remote system cooperate to properly account for emission reduction credits. In one embodiment of the invention, the remote system includes a stored data structure indicating coordinates of boundaries for emission non-attainment areas. The remote device may do the following:

select the GPS-provided indications of vehicle location, e.g., coordinates, that correspond to the control-system-provided indication of intervals during which the vehicle operated in ETS-only operation mode, compare the selected vehicle location coordinates with the stored emission non-attainment area coordinates to determine whether the ETS-only operation modes occurred in non-attainment areas, and grant emission reduction credits responsive to the comparing indicating that instances of the ETS-only operation modes occurred in non-attainment areas.

In various embodiments of the invention, the emission reduction credit process includes the remote system granting:

a) credits only for particular non-attainment areas,
b) one type of credit for one non-attainment area and another type of credit for another non-attainment area,
c) one type of credit for one type of independent electrical system use and another type of credit for another type of independent electrical system use, or a combination of the above.

In general, it should be understood that this granting of credits includes accumulating credits as a function of the time during which the vehicle legitimately operated in ETS-only operation mode, and may include granting an amount of credits for one non-attainment area at a higher time rate of accumulation than for another non-attainment area.

Regarding types of uses, it should be understood that there are additional types of independent electric system uses besides that of episodically switching to ETS-only operation mode for slow speeds or stopping and sometimes during driving at higher speeds. Other independent ETS operating modes are disclosed in the above referenced, related applications, including:

operating in ETS-only operation mode for extended intervals, such as for staging areas as encountered for pick up or delivery, or operating in an idling mode, for example at rest stops, which does not necessarily require use of the electric traction motor but may require cabin comfort heating or cooling and supplying power to convenience electrical outlets.

In embodiments of the invention, the granting of emission reduction credits or the nature of emission reduction credits granted by the remote system may depend on information.

This other information may be in addition to or even instead of simply the location of a vehicle during ETS-only operation mode. In one embodiment of the invention, the remote system also tests to determine a type of vehicle operation according to certain predetermined criteria. In one embodiment, a criteria that the remote system uses as a prerequisite for granting emission reduction credits is the requirement that the vehicle must remain essentially stationary for no more than a predetermined interval. For example, when the elapsed time for stopping at a rest stop the vehicle may not exceed 10 or 12 hours which is a typical maximum for rest stops. If such a time is exceeded, the remote system may not grant emission credits for that interval. The remote system may determine such a condition by reference to coordinates provided by the GPS during the rest stop time interval.

According to another embodiment, the remote system uses a criteria for determining a type of emissions reduction credit for an idling related use, wherein idling is determined at least partly by an essentially stationary vehicle position. Again, the remote system may determine this condition by reference to coordinates provided by the GPS during the particular interval.

In another embodiment, the control system receives a signal that indicates the temperature of the exhaust manifold of the ICE and the temperature of a fuel cell stack for a fuel cell power supply. The data acquisition system in turn receives and reports the temperatures of these temperature sensors to the remote system. The remote system uses these operating temperatures with the above described data as another one of its predetermined criteria for confirming actual operation or type of operation of the vehicle. In a specific embodiment, the remote system uses as a prerequisite for granting emission reduction credits or as a way of determining types of credits the requirement that the temperature of the ICE exhaust manifold must be below a certain predetermined threshold and the temperature of the fuel cell stack must be above one or more predetermined thresholds to indicate that the ICE is off and the fuel cell is under some kind of load. The fuel cell load may include a load due to:
a) the electric traction motor providing motive traction power,
b) an electric heater for cabin heating or an auxiliary electric motor driving the vehicle's air conditioning compressor for cabin cooling, such as while at a rest stop, or
c) the current required for recharging batteries.

According to another embodiment, the control system includes sensors that indicate the amount of current delivered to run the electric traction motor, power the auxiliary electric motor driving the vehicle's air conditioning compressor for cabin cooling, supply the electrical outlets including an outlet for supplying the electric heater for cabin heating, and recharge the system battery. In this embodiment, the data acquisition system receives the current indications from the current sensors and reports them to the remote system, which uses these current amounts with the above described data as another one of its predetermined criteria for confirming actual use and possibly the type of use of the vehicle. In a specific embodiment, that current is supplied to the ETS electric motor is a criteria that the remote system uses as a prerequisite for granting emission reduction credits or as a way of determining an ETS type of credits. In another specific embodiment, that current is supplied to the auxiliary electric motor driving the vehicle's air conditioning compressor for cabin cooling or to electrical outlets, including an outlet for supplying the electric heater for cabin heating is a criteria that the remote device uses as a prerequisite for granting emission reduction credits or as a way of determining an idling type of credits.

In another embodiment, the control system may include a tachometer sensor for the electric traction motor, a clutch position sensor, and other signals to the data acquisition system. In this embodiment, the data acquisition system receives the indications from the sensors and reports them to the remote system which uses these indications as additional factors in predetermined criteria for confirming actual use and possibly types of uses of the vehicle.

Figure 1:
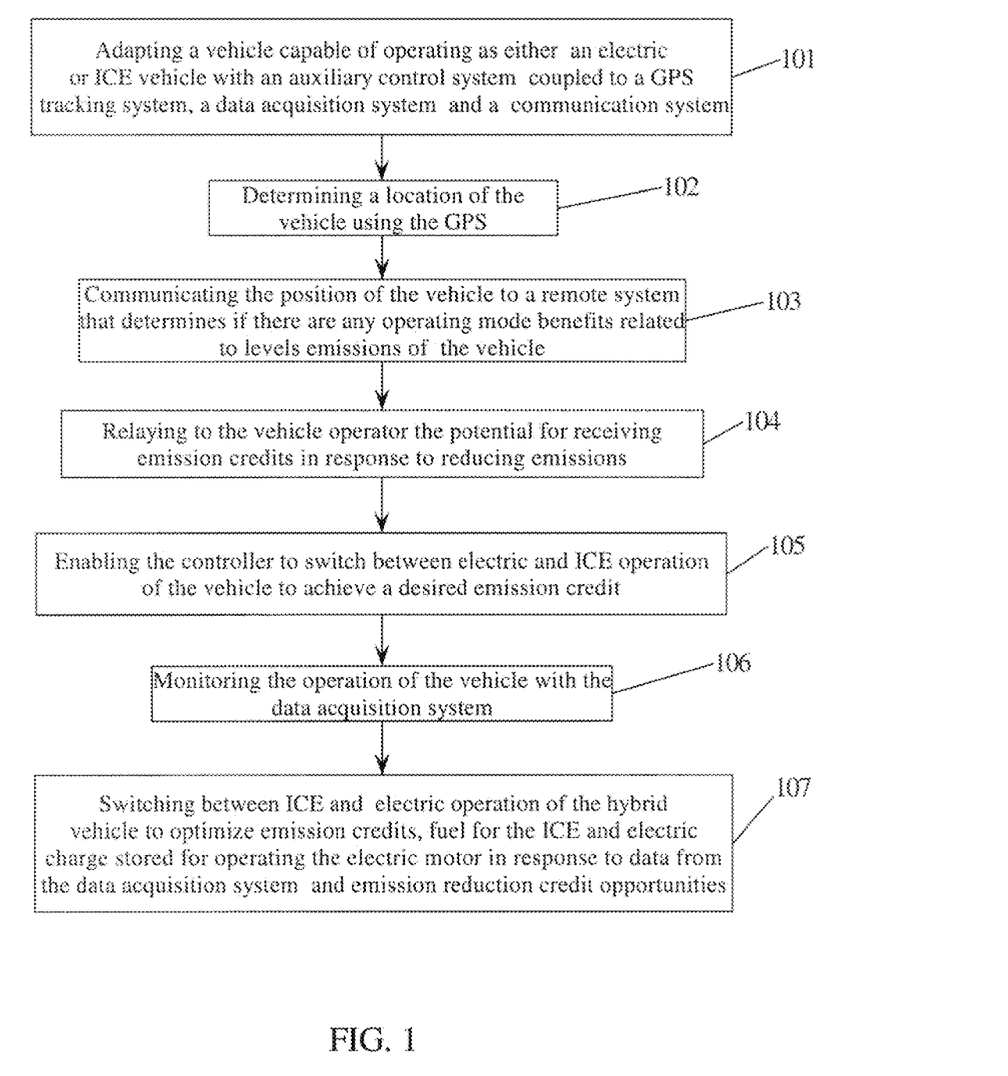
FIG. 1 is a flow diagram of method steps used in disclosed embodiments.

FIG. 1 is a flow diagram of method steps used in the disclosed embodiments. In step 101 a vehicle capable of ICE or ETS operation is adapted with an auxiliary control system coupled to a GPS tracking system, a data acquisition system and a communication system. In step 102, the location of the vehicle is located with the GPS. In step 103, the location of the vehicle is communicated to a remote system equipped with a rule based emission reduction credit process and a data base storing areas of emission non-attainment areas. The remote system determines if there are any operating modes of the vehicle that would result in emission reduction credits. In step 104 this potential for emission credits is relayed to the data collections system. In step 105, the auxiliary control system is enabled to switch between the ICE and the ETS-only operation modes of operation. In step 106, the data acquisition monitors the operation of the vehicle and sends the data to the remote system. In step 107, the operator or the auxiliary system switch the operation mode of the vehicle to qualify for emission reduction credits. The remote system verifies the operating mode of the vehicle and grants appropriate emission reduction credits in response to the operating modes and the criteria in the emission reduction process rules.

Figure 2:
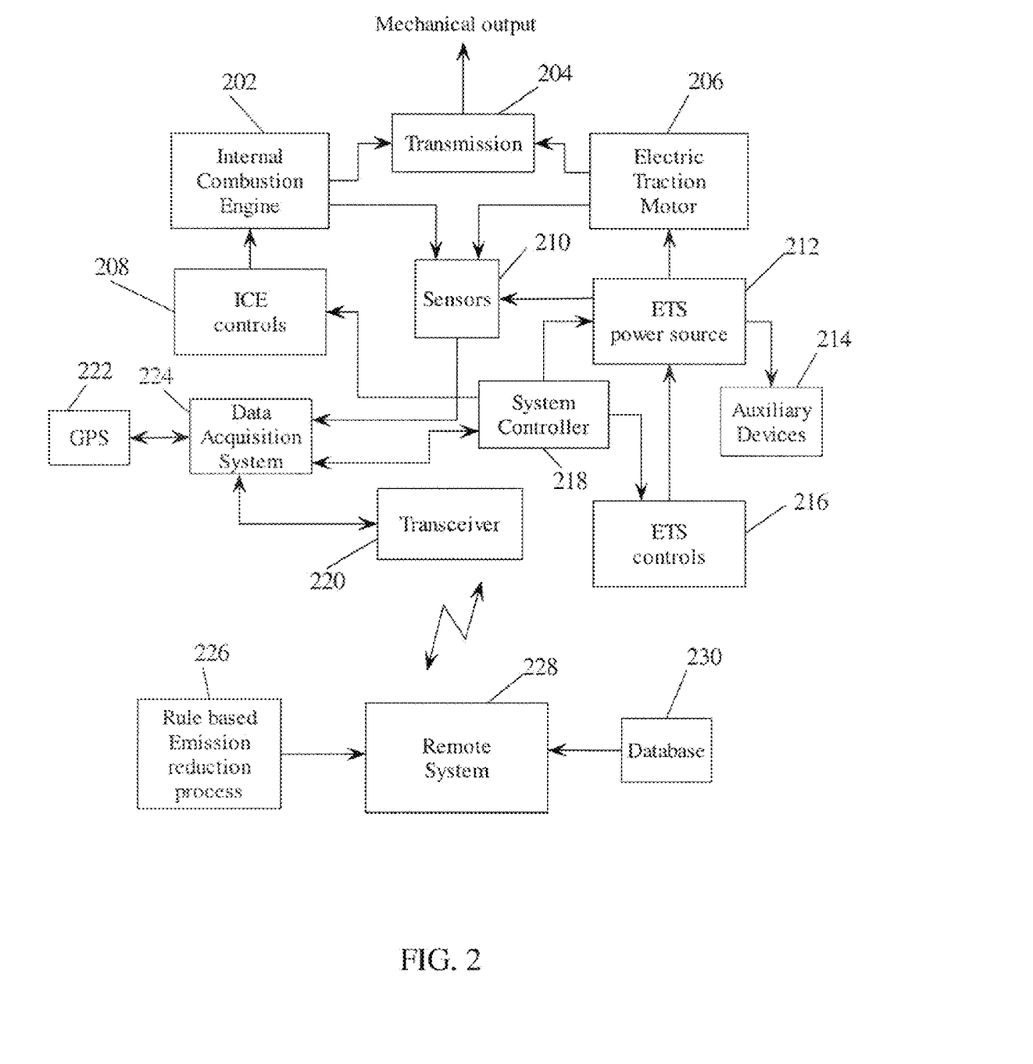
FIG. 2 is a block diagram of system components of disclosed embodiments.

FIG. 2 is a block diagram of system components of used in the present embodiments. Vehicle 200 has an internal combustion engine 202 and a electric traction motor 206 coupled with transmission 204 to provide mechanical output, e.g., torque to the drive wheels. Sensors 210 are coupled to the ICE 202, the ETS motor 206 and the ETS power system 212. These sensors make a variety of parametric measurements indicating temperatures, speed, time, etc. that enable the vehicle's operating modes to be determined by the remote system 228 when the parametric data is sent by the data acquisition system 224. System controller 218 is in communication with the data acquisition system 224 and the ICE controls 208 and the ETS power source 212. In this manner, the appropriate drive system can be selected as the prime mover of the vehicle. System controller 218 signals ETS controller 216 of a desired operating mode and the ETS power source 212 is adjusted correspondingly. ETS power source 212 may also operate auxiliary devices 214. Transceiver 220 sends and receives data to remote system 228 which determines potential for emission reduction credits using the locations of emission non-attainment areas in database 230 and the rules governing granting of emission reduction credits according to the emission reduction process 226. Once the potential for emission reduction credits is communicated to the data acquisition system 224, the operator or the system controller 218 selects the vehicle operation mode. The sensor data is sent to the remote system, which verifies operation modes and locations where the operating modes are used. Any eligible emission reduction credits are granted using this information.

Figure 3:
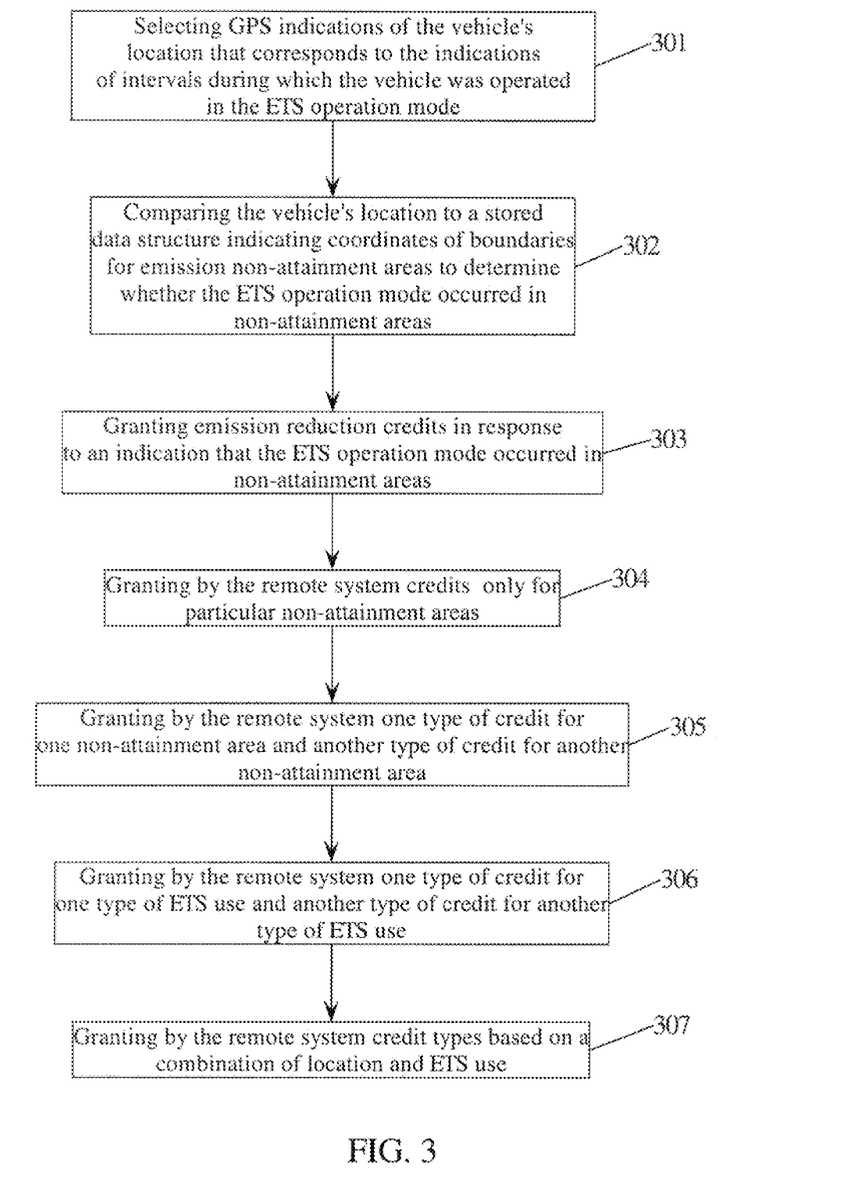
FIG. 3 is a flow diagram of method steps used in disclosed embodiments.

FIG. 3 is a flow diagram of method steps used in disclosed embodiments. In step 301, GPS indications are selected of the vehicle's location that correspond to the indications of locations during which the vehicle was operated in the ETS-only operation mode. In step 302, the vehicle's location is compared to a stored data structure indicating coordinates of boundaries for emission non-attainment areas to determine whether the ETS-only operation mode occurred in non-attainment areas. In step 303, emission reduction credits are granted in response to an indication that the ETS-only operation mode occurred in non-attainment areas. In step 304, the remote system grants credits only for particular non attainment areas. In step 305, the remote system grants one type of credit for one non-attainment area and another type of credit for another non-attainment area. In step 306, the remote system grants one type of credit for type of ETS use and another type of credit for another type of ETS use. In step 307, the remote system grants credit types based on a combination of location and ETS use.

The term "or" is used herein in an inclusive sense that includes the meaning "and." A number of embodiments of the invention have been described. Nevertheless, it will be understood that various modifications may be made without departing from the spirit and scope of the invention.

What is claimed is:

1. A method of operating a vehicle having an electric traction system (ETS) and an internal combustion engine (ICE) and corresponding ETS and ICE operation modes, comprising:
    generating vehicle location data using a GPS system physically coupled to the vehicle;
    sending from the vehicle the vehicle location data to a remote system operating an emission credit process;
    the vehicle receiving from the remote system an indication that emission credits are available for the vehicle as a function of the vehicle location data if the vehicle operates in the ETS operation mode within a specified geographical location;
    enabling a system controller in the vehicle to switch between the ICE and ETS operation modes as a function of the vehicle location data, the indication of the available emission credits, and parametric measurements of an operation of the vehicle; and
    sending from the vehicle the parametric measurements of the operation of the vehicle to the remote system while the vehicle is operating in the ETS operation mode;
    wherein during the ETS operation mode, the vehicle is operating solely under power of an electric motor/generator, and the ICE is shut off; wherein the ETS comprises the electric motor/generator coupled to a transmission of the vehicle via a power takeoff port of the transmission.

2. The method of claim 1 further comprising automatically switching between the ETS and ICE operation modes to achieve an emissions credit result while optimizing fuel for the ICE and stored electrical potential energy for the ETS.

3. The method of claim 1, wherein the system controller includes a data acquisition system suitable for acquiring the parametric measurements of an operation of the vehicle.

4. The method of claim 1, further comprising the vehicle receiving from the remote system a notification of an amount of emission credits awarded for the vehicle as a function of the parametric measurements and the vehicle location data.

5. The method of claim 1, wherein the enabling of the system controller further comprises receiving a signal from a manually operated switch to switch the vehicle to the ETS operation mode.

6. The method of claim 3, wherein the data acquisition system assigns the emission credits or a predetermined cash value according to a schedule that is periodically updated.

7. The method of claim 4, wherein emission credits are only awarded on behalf of the vehicle when the ETS operation mode preempts an otherwise legitimate ICE operation mode.

8. The method of claim 4, wherein emission credits are awarded only if the vehicle remains stationary for no more than a predetermined timer interval in which the emission credits are available for the vehicle.

9. A system for operating a vehicle having an electric traction system (ETS), wherein the ETS comprises an electric motor coupled to the drive train of the vehicle, and an internal combustion engine (ICE) and corresponding ETS and ICE operation modes, wherein the ICE operation mode, movement of the vehicle is a direct result of generation of a motive force by the ICE, and wherein the ETS operation mode, movement of the vehicle is a direct result of generation of a motive force by the ETS, the system for operating the vehicle further comprising:
    a data transceiver system configured for sending to an emission credit system vehicle location data that identifies the geographical location of the vehicle, wherein the emission credit system is geographically remote from the geographical location of the vehicle;
    the data transceiver system also configured for receiving signals from the emission credit system that emission credits are available for the vehicle as a function of the vehicle location data if the vehicle operates in the ETS operation mode within a specified geographical location;
    a system controller that has logic circuitry that switches between the ICE and ETS operation modes in response to receiving data corresponding to the vehicle location data, the signals from the emission credit system that emission credits are available for the vehicle, and parametric measurements of an operation of the vehicle wherein during the ETS operation mode, the movement of the vehicle is solely the direct result of the generation of the motive force by the ETS, and the ICE is shut off;
    wherein the electric motor is coupled to the drive train via a power takeoff port of a transmission in the drive train.

10. The system of claim 9, wherein the logic circuitry is configured to automatically switch between the ETS and the ICE operation modes to achieve an award of the emission credits while optimizing fuel for the ICE and stored electrical energy potential for the ETS.

11. The system of claim 9, wherein the system controller has a data collection system suitable for acquiring the parametric measurements of the operation of the vehicle.

12. The system of claim 11, further comprising:
    the data transceiver system configured for sending from the vehicle the parametric measurements of the operation of the vehicle to the emission credit system during a time interval when the vehicle is operating in the ETS operation mode; and
    the data transceiver system configured for receiving from the emission credit system a notification of an amount of emission credits awarded for the vehicle as a function of the parametric measurements and the vehicle location data.

13. The system of claim 9, wherein the system controller further comprises logic circuitry for receiving a signal from a manually operated switch to switch the vehicle to the ETS operation mode.

14. The system of claim 13, wherein the system controller assigns the emission credits or a predetermined cash value according to a schedule that is periodically updated.

15. The system of claim 12, wherein emission credits are only awarded on behalf of the vehicle when the ETS operation mode preempts an otherwise legitimate ICE operation mode.

16. A system for awarding emission credits to a vehicle having an electric traction system (ETS), wherein the ETS comprises an electric motor coupled to the drive train of the vehicle, and an internal combustion engine (ICE) and corresponding ETS and ICE operation modes, wherein the ICE operation mode, movement of the vehicle is a direct result of generation of a motive force by the ICE, and wherein the ETS operation mode, movement of the vehicle is a direct result of generation of a motive force by the ETS, the system comprising:
  communications means configured for sending vehicle location data that identifies the geographical location of the vehicle to an emission credit system, wherein the emission credit system is geographically remote from the geographical location of the vehicle;
  a database coupled to the emission credit system that stores an amount and types of emission credits available as a function of vehicle location, emission control regulations, and vehicle operation modes;
  logic circuitry coupled to the emission credit system configured for determining that emission credits are available to be awarded to the vehicle as a function of the vehicle location data received from the vehicle;
  communications means configured for sending signals from the emission credit system to the vehicle that the emission credits are available for the vehicle as a function of the vehicle location data when the vehicle operates in the ETS operation mode within a specified geographical location;
  a system controller configured for switching from the ICE operation mode to the ETS operation mode as a function of receipt by the vehicle of the signals from the emission credit system to the vehicle that the emission credits are available for the vehicle when the vehicle operates in the ETS operation mode within the specified geographical location; and
  communications means configured for sending parametric measurements of an operation of the vehicle from the vehicle to the emission credit system; wherein during the ETS operation mode, the movement of the vehicle is solely the direct result of the generation of the motive force by the ETS, and the ICE is shut off; wherein the electric motor is coupled to the drive train via a power takeoff port of a transmission in the drive train.

17. The system of claim 16, wherein the logic circuitry coupled to the emission credit system is configured to award the emission credits to the vehicle as a function of:
  a) the vehicle location data that corresponds to indications of intervals during which the vehicle was operated in the ETS operation mode; and
  b) a comparison of the vehicle location data to a stored data structure indicating coordinates of boundaries for emission non-attainment areas to determine whether the ETS operation mode occurred in non-attainment areas.

18. The system of claim 16, wherein the logic circuitry coupled to the emission credit system is configured to award the emission credits to the vehicle:
  a) only for particular non-attainment areas;
  b) one type of credit for one non-attainment area and another type of credit for another non-attainment area;
  c) one type of credit for one type of ETS use and another type of credit for another type of ETS use; and
  d) credit types based on a combination of location and ETS use.

19. The system of claim 16, wherein the logic circuitry coupled to the emission credit system is configured to analyze the parametric measurements and the vehicle location data to determine an actual operating status of the vehicle and its actual location.

20. The system of claim 19, wherein the logic circuitry coupled to the emission credit system is configured to award emission credits only if the vehicle remains stationary for no more than a predetermined timer interval.

21. An operating system for a vehicle having an electric traction system (ETS), wherein the ETS comprises an electric motor coupled to the drive train of the vehicle, and an internal combustion engine (ICE) and corresponding ETS and ICE operation modes, wherein the ICE operation mode, movement of the vehicle is a direct result of generation of a motive force by the ICE, and wherein the ETS operation mode, movement of the vehicle is a direct result of generation of a motive force by the ETS, the system comprising:
  a GPS device physically coupled to the vehicle configured for determining and outputting a geographical location of the vehicle;
  a system controller configured for switching the vehicle between the ICE operation mode and the ETS operation mode, the system controller further configured to award emission reduction credits to the vehicle as a function of (1) the geographical location of the vehicle that corresponds to indications of intervals during which the vehicle is operated in the ETS operation mode, and (2) a comparison of the geographical location of the vehicle to a stored data structure indicating coordinates of boundaries for emission non-attainment areas to determine whether the ETS operation mode occurred in non-attainment areas; wherein during the ETS operation mode, the movement of the vehicle is solely the direct result of the generation of the motive force by the ETS, and the ICE is shut off; wherein the electric motor is coupled to the drive train via a power takeoff port of a transmission in the drive train.

22. The system of claim 1, wherein system controller is configured to award the emission reduction credits to the vehicle:
  a) only for particular non-attainment areas;
  b) one type of credit for one non-attainment area and another type of credit for another non-attainment area;
  c) one type of credit for one type of ETS use and another type of credit for another type of ETS use; and
  d) credit types based on a combination of location and ETS use.

* * * * *